(12) United States Patent
Bartlett (10) Patent No.: US 9,063,524 B2
(45) Date of Patent: Jun. 23, 2015

(54) CONTROL SYSTEM FOR A PIPE HANDLING APPARATUS

(71) Applicant: Bartlett Power & Automation LLC, Glenwood Springs, CO (US)

(72) Inventor: Joshua Bartlett, Glenwood Springs, CO (US)

(73) Assignee: Bartlett Power & Automation LLC, New Castle, CO (US)

( * ) Notice: Subject to any disclaimer, the term of this patent is extended or adjusted under 35 U.S.C. 154(b) by 427 days.

(21) Appl. No.: 13/672,228

(22) Filed: Nov. 8, 2012

(65) Prior Publication Data

US 2013/0116853 A1 May 9, 2013

Related U.S. Application Data

(60) Provisional application No. 61/557,160, filed on Nov. 8, 2011.

(51) Int. Cl.
| | |
|---|---|
| *G06F 19/00* | (2011.01) |
| *G05B 11/01* | (2006.01) |
| *E21B 44/02* | (2006.01) |
| *E21B 19/14* | (2006.01) |
| *E21B 19/16* | (2006.01) |

(52) U.S. Cl.
CPC .................. *G05B 11/01* (2013.01); *E21B 44/02* (2013.01); *E21B 19/14* (2013.01); *E21B 19/16* (2013.01)

(58) Field of Classification Search
CPC ............ E21B 19/14; E21B 19/16; E21B 4/02
USPC ............... 700/291; 414/22.51, 22.61
See application file for complete search history.

(56) References Cited

U.S. PATENT DOCUMENTS

| 4,453,872 | A | * | 6/1984 | Frias et al. | 414/22.61 |
|---|---|---|---|---|---|
| 4,740,113 | A | * | 4/1988 | Hirose et al. | 406/70 |
| 5,145,290 | A | * | 9/1992 | Wise | 405/179 |
| 5,711,382 | A | * | 1/1998 | Hansen et al. | 175/52 |
| 5,988,299 | A | * | 11/1999 | Hansen et al. | 175/52 |
| 2004/0208738 | A1 | * | 10/2004 | Morelli et al. | 414/745.8 |
| 2006/0285941 | A1 | * | 12/2006 | Fikowski et al. | 414/22.54 |
| 2010/0108381 | A1 | * | 5/2010 | Sinnerstad et al. | 175/24 |
| 2013/0116853 | A1 | * | 5/2013 | Bartlett | 700/302 |

OTHER PUBLICATIONS

"Cable-pull encoders for linear position feedback", Baumer website. Printed Mar. 2, 2015 from http://www.baumer.com/us-en/products/distance-measurement/cable-pull-encoders/.*

* cited by examiner

*Primary Examiner* — Michael D Masinick
(74) *Attorney, Agent, or Firm* — Holland & Hart LLP (57) ABSTRACT

A pipe handling system control apparatus is disclosed which includes a remote control that outputs a throttle signal to control speed of movement of a trough of the pipe handling apparatus. A position sensor outputs a position of the trough of the pipe handling apparatus, and a controller receives the output of the position sensor and limits the throttle signal from the remote control based on the output of the position sensor. The controller may receive the signal from the position sensor indicating the trough is within a predefined pocket and limit the throttle signal when the trough is within the pocket. The controller may limit the throttle signal, for example, to 18 percent of full throttle when the trough is within the pocket. The position sensor may include a cable pull sensor having an encoder that outputs a signal representative of a position of the trough.

15 Claims, 7 Drawing Sheets

CONTROL SYSTEM FOR A PIPE HANDLING APPARATUS

CROSS-REFERENCE TO RELATED APPLICATIONS

This application claims priority to U.S. Provisional Patent Application No. 61/557,160, entitled "CONTROL SYSTEM FOR A PIPE HANDLING APPARATUS," filed on Nov. 8, 2011, the entire disclosure of which is incorporated herein by reference.

FIELD

The present disclosure is directed to a control system for a pipe handling apparatus, and more specifically, to a control system that adjusts the speed of movement of a trough of the pipe handling apparatus based on a position of the trough.

BACKGROUND

Oil and gas wells are generally created by drilling a hole into the earth with a drilling rig that rotates a drill string with a bit attached. After the hole is drilled, sections of steel pipe (casing), slightly smaller in diameter than the borehole, are placed in the hole. Cement may be placed between the outside of the casing and the borehole. The casing provides structural integrity to the newly drilled wellbore, in addition to isolating potentially dangerous high pressure zones from each other and from the surface.

Drill strings of pipe for oil and gas wells are generally assembled or disassembled vertically on a derrick one joint at a time, and are stored horizontally on pipe racks situated on the ground adjacent the rig. The work floor of the rig is typically elevated substantially above the pipe rack such that transferring sections of pipe to and from the racks and the work floor is necessary, and further requires careful handling of the heavy pipe to protect the workers and the pipe.

Various pipe handling systems are known for presenting sections of pipe to a raised derrick work floor. Some common systems are referred to as "pipewranglers," generally include a platform having a boom that may provide pipe to a raised rig work floor.

SUMMARY

A common occurrence when operating a pipe handling assembly such as a pipewrangler is referred to as "slamming," in which an end of the boom contacts a cavity and/or base of the platform with a relatively high force, resulting in a loud audible noise. Slamming may cause a noise nuisance, and may also result in damage and/or undue wear and tear on the pipe handling assembly. In various embodiments described herein, a control system is included in the pipe handling assembly and controller therefor that reduces or eliminates slamming.

In one embodiment, the present disclosure provides a pipe handling system control apparatus that includes: a remote control that outputs a throttle signal to control speed of movement of a trough of the pipe handling apparatus; a position sensor that outputs a position of the trough of the pipe handling apparatus; and a controller that receives the output of the position sensor and limits the throttle signal from the remote control based on the output of the position sensor. The controller may receive the signal from the position sensor indicating the trough is within a predefined pocket and limits the throttle signal when the trough is within the pocket. In one embodiment, the controller limits the throttle signal to 18 percent of full throttle when the trough is within the pocket. In some embodiments, the position sensor comprises a cable pull sensor. The cable pull sensor may include an encoder that outputs a signal representative of a position of the trough.

In other embodiments, the present disclosure provides a method for controlling a pipe handling system, the method including: receiving, at a controller, a throttle signal from a remote control; outputting the throttle signal to an actuator that moves a trough of the pipe handling apparatus, a magnitude of the throttle signal determining the speed at which the actuator moves the trough; receiving position information corresponding to a position of the trough; and limiting the magnitude of the throttle signal output to the actuator based on the position information. The limiting of the magnitude of the throttle signal may include determining that the trough is within a predefined pocket; determining that the throttle signal is above a predetermined throttle signal limit when the trough is within the pocket; and reducing the throttle signal to the predetermined throttle signal limit when the trough is within the pocket. In some embodiments, the predetermined throttle signal limit is 18 percent of full throttle when the trough is within the pocket. The position information may be received from a position sensor, which may comprise a cable pull sensor. The cable pull sensor may include an encoder that outputs a signal representative of a position of the trough. The remote control may be coupled with the controller through a wireless or wired connection.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Figure 1:
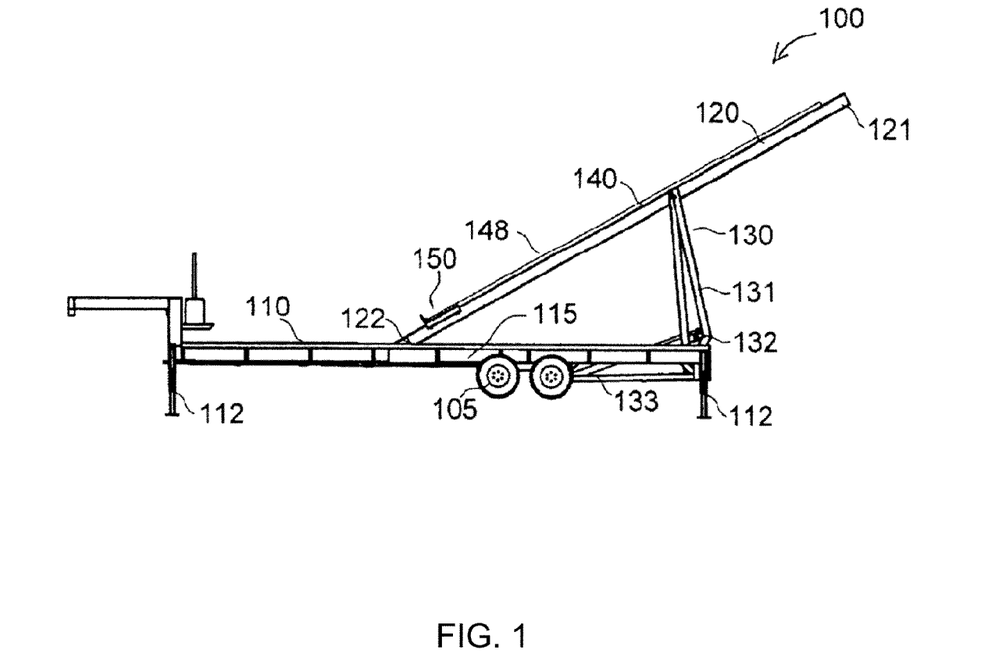
FIG. 1 is an illustration of a pipe handling apparatus in accordance with various embodiments.

Referring to FIG. 1 a pipe handling system 100 is illustrated. The system includes a base 110 mounted on undercarriage assembly 105, which may be stabilized by legs 112 when in operation. Boom 120 is shown with proximal end 121 in a raised position moving toward a derrick work floor (not shown) with distal end 122 gliding along cavity 115 guided by a track located within the base. The boom 120 is movable between a raised position, such as illustrated in FIG. 1, and a lowered position in which the boom 120 may be nested within cavity 115 and base 110. Boom 120 includes a trough 140 that may carry a section of pipe 148. In operation, an actuator 130 raises boom 120 out of cavity 115 into an extended position toward the derrick work floor and back into a lowered position within the trough 140. Trough 140, having pipe 148 therein, extends longitudinally along boom 120 and may be formed therein or fastened thereon, and includes a carriage assembly 150 operatively coupled thereto that may be driven bi-directionally between the distal end 122 and the proximal end 121 of boom 120.

As shown in FIG. 1, carriage assembly 150 contacts the distal end of pipe 148. The proximal end 121 of boom 120 is raised and lowered by the actuator 130 between raised and lowered positions. In one embodiment, the actuator comprises pivoting arm 131 and suitable linkage 132 actuated by hydraulic ram 133, for the purpose of presenting pipe 148 together with collars, or the like (not shown) laying in trough 140, to the rig floor for further handling. This process may be referred to as the "pick up" sequence. To return from the rig floor to ground, pipe 148 is lowered into proximal end 121 of boom 120 at the level of the rig floor and glides down trough 140 until it comes to rest against carriage assembly 150 suitably positioned along boom 120. The actuator 130 then lowers boom 120 with pipe 148 therein, such that in its fully lowered or "laid down" position boom 120 nests inside base 110. Although base 110 is illustrated in a mobile embodiment having any suitable undercarriage assembly 105, a person of skill in the art would understand that base 110 may have other configurations, such as a stationary base, for example.

Generally, in operation, the boom 120 of pipe handling assembly 100 is raised above the base 110 when presenting pipe 148 to the rig floor, or when receiving pipe from the rig floor. When the boom 120 is lowered, initially the distal end 122 comes into contact with the cavity 115, then glides along the track within cavity 115 until the proximal end 121 comes into contact with the cavity 115. An operator generally controls the pipe handling assembly 100 to raise and lower the boom 120 as necessary to move pipe between the rig floor and pipe racks. A common occurrence when operating a pipe handling assembly such as illustrated is referred to as "slamming," in which either the proximal end 121 and/or distal end 122 contacts the cavity 115 and/or base 110 with a relatively high force, resulting in a loud audible noise. Slamming may cause a noise nuisance, and may also result in damage and/or undue wear and tear on the pipe handling assembly. In various embodiments described herein, a control system is included in the pipe handling assembly and controller therefor that reduces or eliminates slamming.

Figure 2:
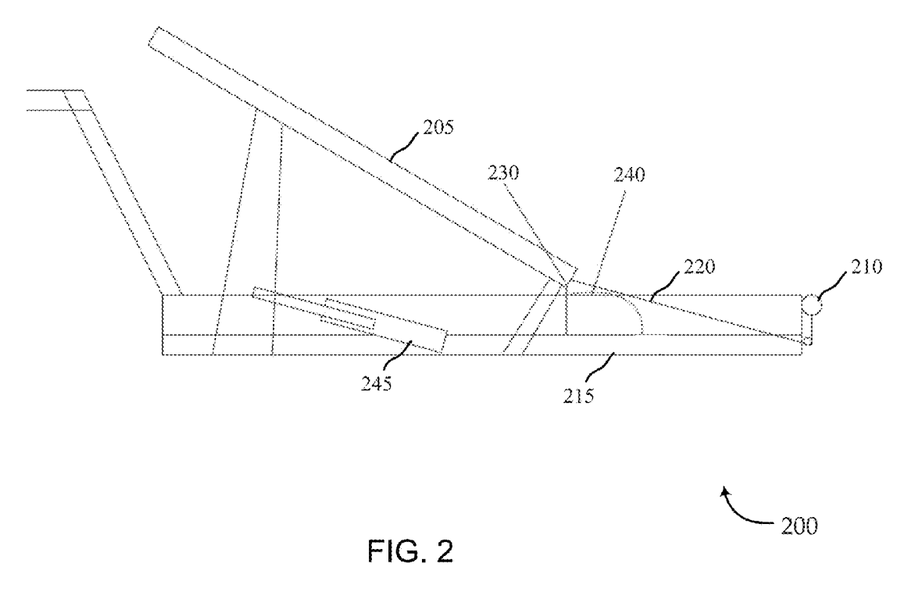
FIG. 2 illustrates a pipe handling apparatus having a boom in a raised position entering a high pocket of throttle reduction.
Figure 3:
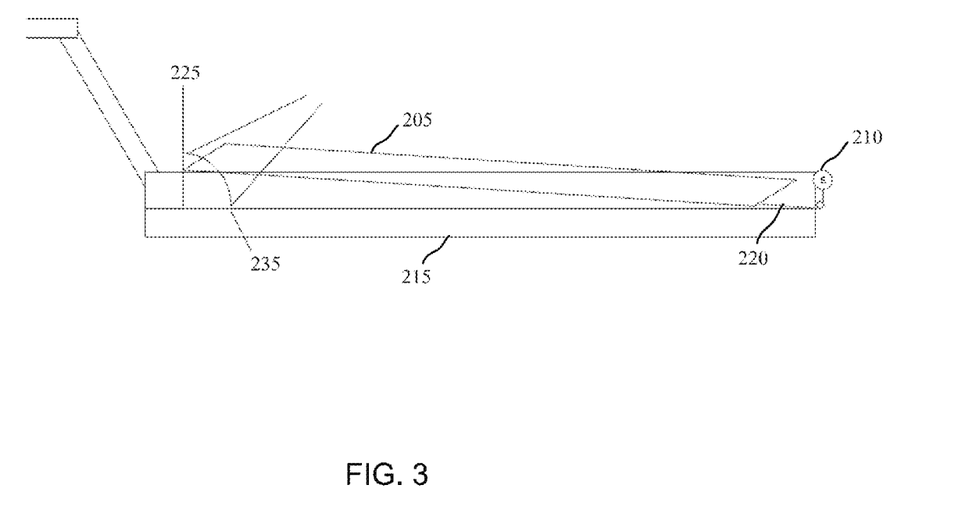
FIG. 3 illustrates a pipe handling apparatus having a boom in a lowered position entering a low pocket of throttle reduction.

With reference to FIGS. 2 and 3, the operation of a control system of an embodiment is described for a pipe handling system 200. In this embodiment, an operator uses a remote control to control the raising and lowering of boom 205. The pipe handling assembly includes one or more position sensors 210 that sense the position of the boom 205 relative to the base 215. In the embodiment of FIGS. 2 and 3, the sensor 210 is located in the base 215 and a cable 220 extends from the distal end of the boom 205 to sensor 210, which may include, for example, a cable pick-up through a signal transducer that includes an encoder that provides an output that is determined by movement of the cable 220. In one embodiment, the sensor 210 includes one or more cable pull sensors that convert linear motion into rotary motion when the cable 220 is pulled, in either direction, through the sensor 210. The rotary motion may, for example, drive an incremental or absolute encoder which provides the signals for control evaluation or further processing by the remote control. Of course, other types of sensors may be used to sense the position of the boom relative to the base, such as proximity sensors located on the boom 205 and base 215, optical sensors, capacitive or inductive sensors, etc. In the embodiment of FIG. 2, a roller low position 225 and high position 230, that define low 235 and high 240 pockets, are set by an operator at the remote. For example, the remote may have a programming mode in which the operator may move the boom 205 to the roller high position 230 and program the roller high position 230 as the position indicated by the output of the sensor(s) when the boom is at that position. In embodiments that use a cable pull sensor, the output of an encoder at that position may be programmed as the roller high position. Similarly, the roller low position 225 may be programmed into the remote.

In operation, an operator may move the boom 205 down with a throttle fully engaged until the boom 205 reaches the roller low position 225. Normally, if the remote throttle remains fully engaged through this position, such an act would generate a slam when tail end (distal) of the boom 205 contacts the cavity within the base 215. When the tail (distal) end of the boom 205 enters the low pocket 235, the remote control overrides the throttle signal provided by the operator and automatically slows tail (distal) end of the boom 205 down so as to create a smooth transition into the base 215. The low pocket 235 is defined, such that and when the tail (distal) end of the boom 215 moves beyond the low position 225 as the boom 215 is moved up, the throttle signal provided by the user is used directly to control the operation of the boom 215. As mentioned, the low position 225 for the low pocket 235 may be set by the operator at the remote. The low position 225 starts speed reduction, and in one embodiment a control program limits the throttle control from the remote such that only a linear sloped ramped from 100 to 18 percent of full throttle may be provided to the boom 215 lifting mechanism (e.g., actuator 245). Similarly, the throttle signal may be limited when boom 215 passes high position 230 into high pocket 240. The starting point of throttle reduction is initiated in the control program according to the roller high and low pockets as set by the operator. In one embodiment, a bit is triggered when the trough enters the pocket in the down position only, and the computer overrides the operator with its own ramp down signal. If the trough is in the predetermined pocket, in one embodiment, the speed can only go 18% of throttle.

FIG. 3 illustrates a low pocket 235 that is defined around the entry of the top (proximal) end of the boom 205 enters the cavity in the base 215. Similarly as described above, the low pocket 235 may be programmed with a pocket low position 225. The low position 225 for the low pocket 235 may be programmed in a similar manner as discussed above, and speed reduction is enabled when top (proximal) end of boom 205 passes the position 225 of the low pocket 235 even if operator has throttle fully engaged. The boom 205 enters the pocket 235 and makes a smooth transition into the frame without slamming. In one embodiment the controller overrides such that only 18 percent of full throttle may be provided to the boom lifting mechanism. When the top end of the boom 205 enters the pocket 235 the program overrides the operators joystick with its own linear ramp down signal from 100 to 18% and not to exceed 18%. When the top (proximal) end of the boom 205 passes through the low pocket 235, speed or throttle reduction may be disabled, allowing an operator to operate using the full throttle range.

Figure 4:
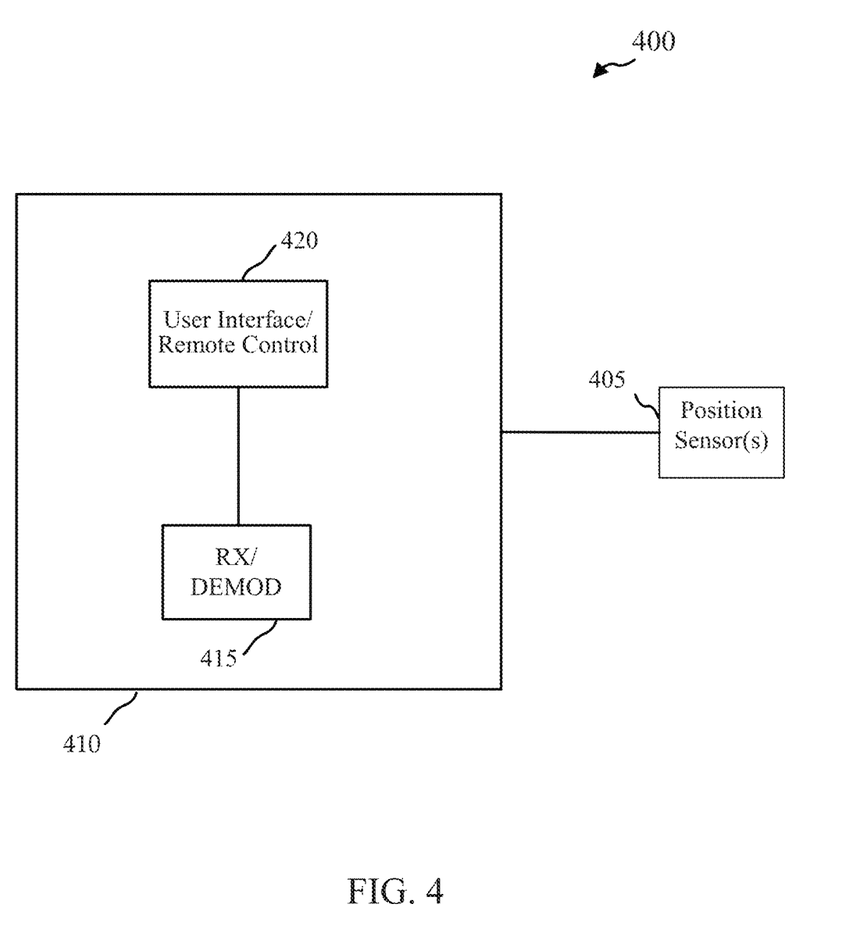
FIG. 4 illustrates an exemplary controller in accordance with various embodiments.

With reference now to FIG. 4, a block diagram illustration of a system 400 of an embodiment is described. In this embodiment, position sensor(s) 405 provides counts to a counter card 410. The position sensor(s) 405 may be connected to the controller 410 through a wired connection, or may be connected, as indicated in FIG. 4, through a wireless connection through a transmitter associated with the position sensor(s) 405 and a receiver/demodulator 415 at the controller. Such a wireless connection may be completed using any appropriate wireless connection, such as an 802.11 protocol, Bluetooth® protocol, Zigbee® protocol, and the like. A wireless connection may also be made through a frequency modulated (FM) or amplitude modulated (AM) communication, or the like. In embodiments with multiple sensors, the sensors may provide information periodically such that two sensors may not transmit information to the controller simultaneously. In some embodiments, one or more sensors may communicate related information through a master sensor that communicates with the controller 410. In embodiments that use a wired connection, communications between the sensor(s) 405 may be completed through a two-wire serial connection between the sensor(s) 405 and the controller 410. The controller 410 further includes a user interface (or remote control) 420. The user interface 420 may include a throttle, and programming interfaces that allow for movement of the boom and programming of the high and low positions for the first and second pockets, as described above. User interface 420 can also be connected to controller 410, in one embodiment, through a two wire profibus industrial communication connection. The Remote 420 is connected to controller 410 (also referred to as "the plc") through the profibus, according to this embodiment. The position sensor sends counts to controller 410 through a 4-pair shielded wire, in one embodiment.

Through use of feedback and throttle control override, systems of various embodiments may provide more efficient pipe laying and pick up by utilizing full speed for at or near the maximum time that full speed may be used, and reduced the speed only when the boom approaches a point at which a slam may occur. Controller(s) and sensor(s) may be field maintainable by maintenance staff with minimal downtime and cost. As mentioned, systems such as described can reduce or eliminate the tail end and top end of the boom from slamming, reducing noise and damage to the assembly, thus helping to reduce potentially expensive and time-consuming repairs. The feedback mechanisms described herein may be installed onto existing remotes to prevent slamming, or purchased along with the Remote Console.

Figure 5:
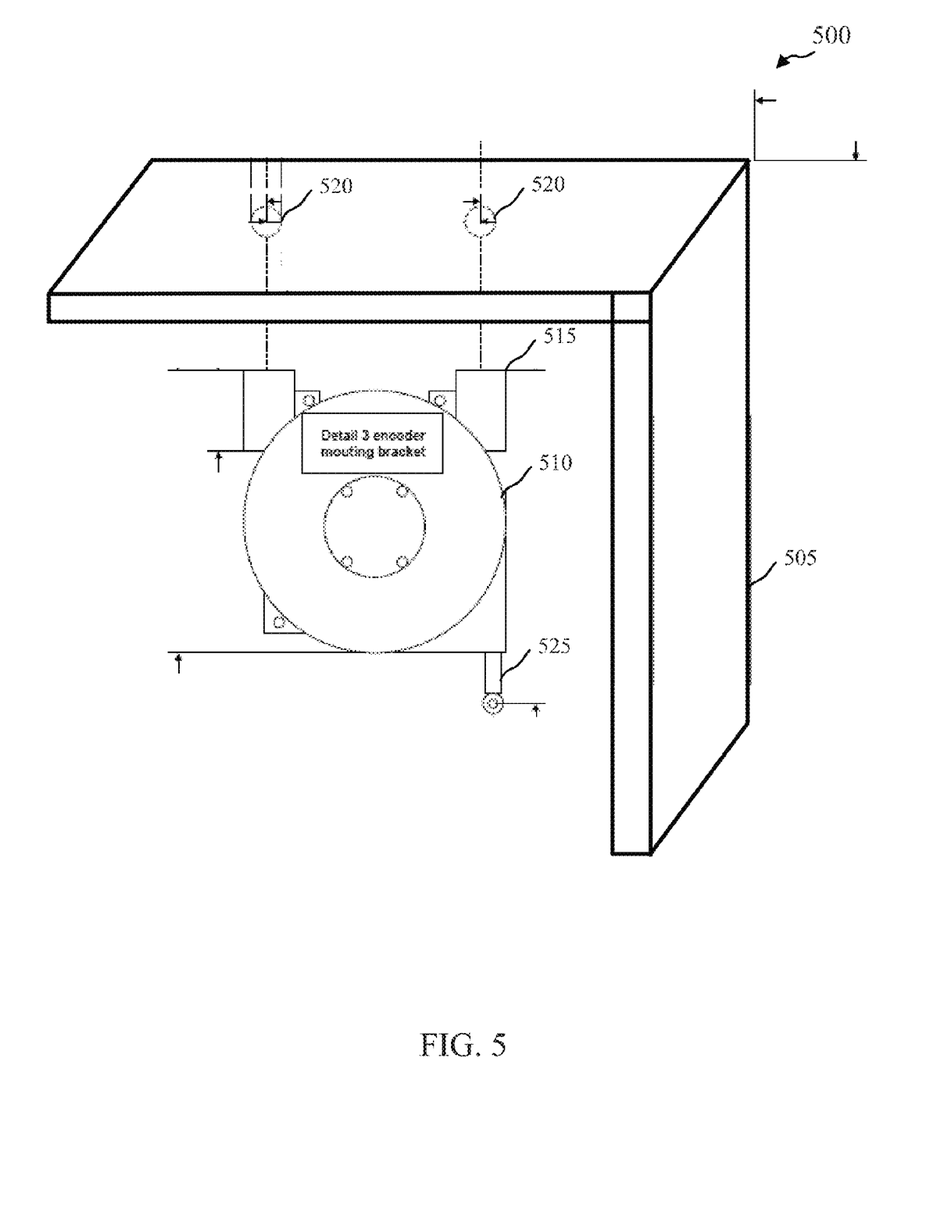
FIG. 5 illustrates an encoder assembly according to various embodiments.
Figure 6:
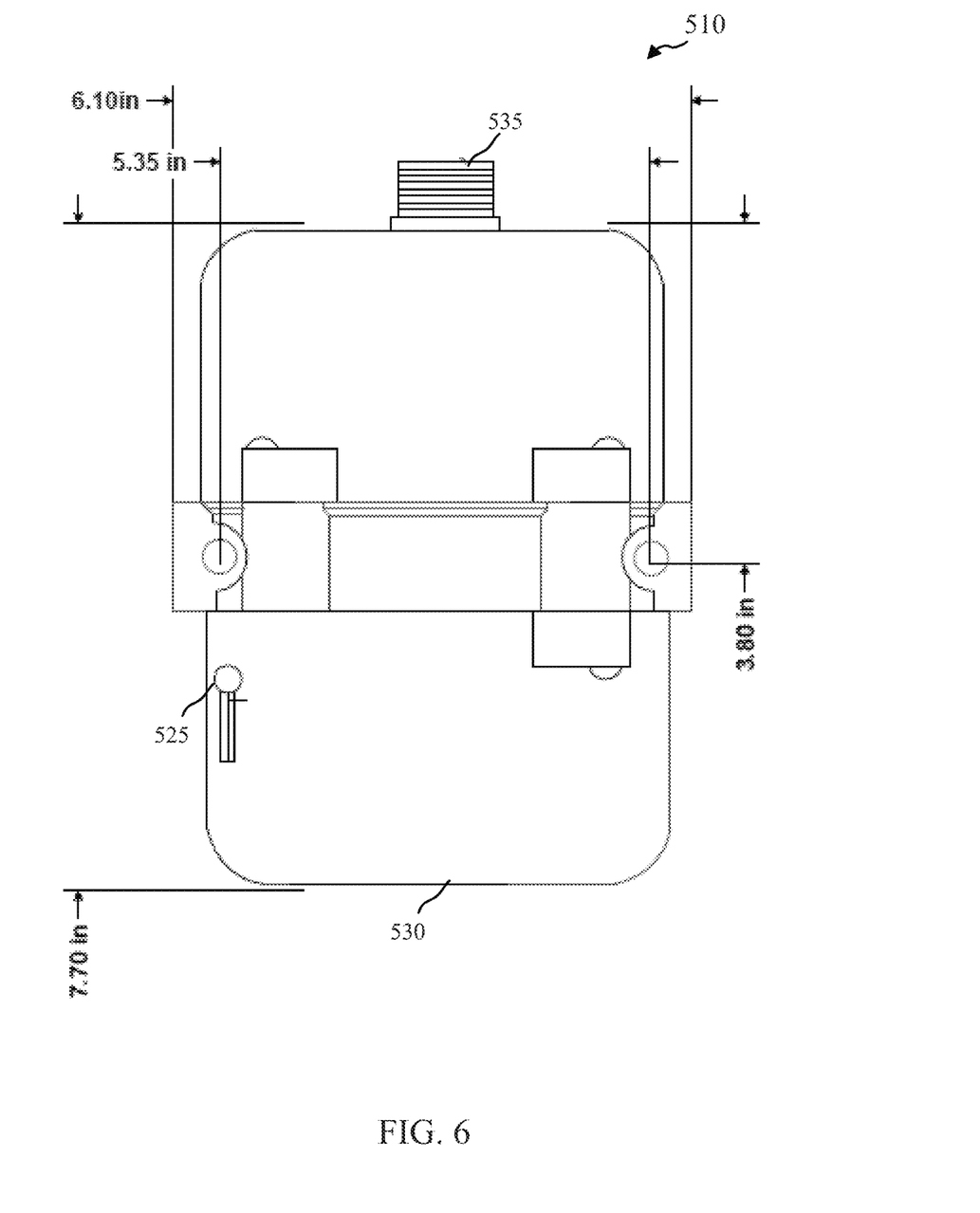
FIG. 6 illustrates a top view of an encoder of an embodiment.
Figure 7:
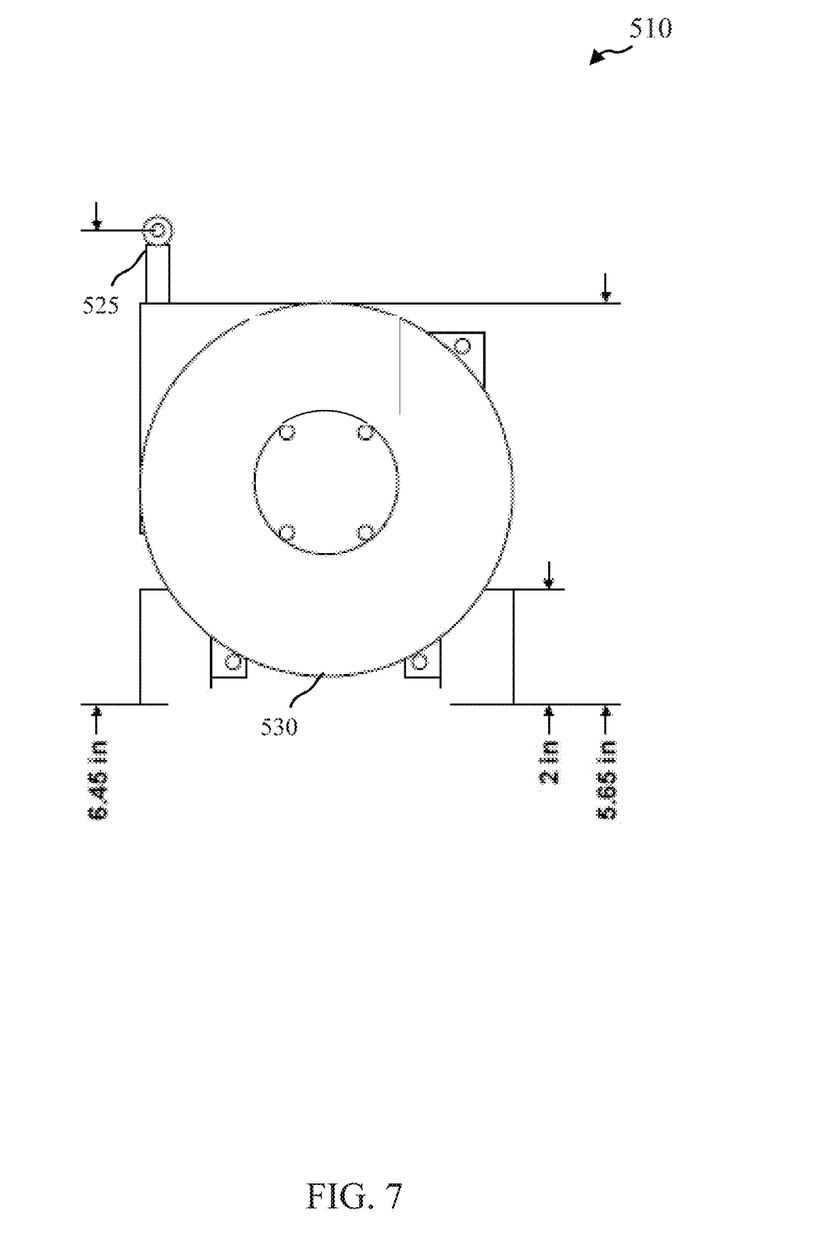
FIG. 7 illustrates a side view of an encoder of an embodiment.

FIG. 5 illustrates a position detector assembly 500 according to various embodiments. The assembly 500 includes a mounting bracket 505 that may be secured to an appropriate location on the base of the pipe handling apparatus. In the embodiment of FIG. 5, the position sensor is an encoder 510 that includes a mounting bracket 515 that may be coupled with mounting bracket 505 through holes 520. In some embodiments, the encoder 510 is a cable pull encoder that has a cable 525 that may be pulled through the encoder 510 and used to determine a position of the boom. FIGS. 6 and 7 illustrate top and side views, respectively, of an encoder 510 according to an embodiment. In this embodiment, the encoder 510 is a Unimeasure model no. HX-EP-600-H4-L6M digital encoder, having an 8 to 28 vdc push pull differential line drive. The encoder 510 has a housing 530 and an output 535 that outputs digital signal information related to the current count of the encoder 510 based on the position of cable 525. Of course, it will be readily understood by one of skill in the art that other position sensors may be used to determine position location of a boom relative to a base in a pipe handling apparatus.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A pipe handling system control apparatus, comprising:
a remote control that outputs a throttle signal to control speed of movement of a trough of the pipe handling apparatus;
a position sensor that outputs a position of the trough of the pipe handling apparatus;
a controller that receives the output of the position sensor and limits the throttle signal from the remote control based on the output of the position sensor.

2. The apparatus of claim 1, wherein the controller receives the signal from the position sensor indicating the trough is within a predefined pocket and limits the throttle signal when the trough is within the pocket.

3. The apparatus of claim 2, wherein the controller limits the throttle signal to 18 percent of full throttle when the trough is within the pocket.

4. The apparatus of claim 1, wherein the position sensor comprises a cable pull sensor.

5. The apparatus of claim 4, wherein the cable pull sensor comprises an encoder that outputs a signal representative of a position of the trough.

6. The apparatus of claim 1, wherein the remote control is coupled with the controller through a wireless connection.

7. The apparatus of claim 1, wherein the remote control is coupled with the controller through a wired connection.

8. A method for controlling a pipe handling system, comprising:
   receiving, at a controller, a throttle signal from a remote control;
   outputting the throttle signal to an actuator that moves a trough of the pipe handling apparatus, a magnitude of the throttle signal determining the speed at which the actuator moves the trough;
   receiving position information corresponding to a position of the trough; and
   limiting the magnitude of the throttle signal output to the actuator based on the position information.

9. The method of claim 8, wherein the limiting the magnitude of the throttle signal comprises:
   determining that the trough is within a predefined pocket;
   determining that the throttle signal is above a predetermined throttle signal limit when the trough is within the pocket; and
   reducing the throttle signal to the predetermined throttle signal limit when the trough is within the pocket.

10. The method of claim 9, wherein the predetermined throttle signal limit is 18 percent of full throttle when the trough is within the pocket.

11. The method of claim 8, wherein the position information is received from a position sensor. comprises a cable pull sensor.

12. The method of claim 11, wherein the position sensor comprises a cable pull sensor.

13. The method of claim 12, wherein the cable pull sensor comprises an encoder that outputs a signal representative of a position of the trough.

14. The method of claim 8, wherein the remote control is coupled with the controller through a wireless connection.

15. The method of claim 8, wherein the remote control is coupled with the controller through a wired connection.

\* \* \* \* \*